(12) United States Patent
Sarrut

(10) Patent No.: US 7,591,936 B2
(45) Date of Patent: Sep. 22, 2009

(54) MICROFLUIDIC DEVICE WHEREIN THE LIQUID/FLUID INTERFACE IS STABILIZED

(75) Inventor: Nicolas Sarrut, Seyssinet-Pariset (FR)

(73) Assignee: Commissariat a l'Energie Atomique, Paris (FR)

( * ) Notice: Subject to any disclaimer, the term of this patent is extended or adjusted under 35 U.S.C. 154(b) by 584 days.

(21) Appl. No.: 10/534,456

(22) PCT Filed: Nov. 27, 2003

(86) PCT No.: PCT/FR03/03519

§ 371 (c)(1),
(2), (4) Date: May 27, 2005

(87) PCT Pub. No.: WO2004/052542

PCT Pub. Date: Jun. 24, 2004

(65) Prior Publication Data

US 2006/0042950 A1    Mar. 2, 2006

(30) Foreign Application Priority Data

Dec. 4, 2002   (FR) .................................. 02 15254

(51) Int. Cl.
*G01N 27/453* (2006.01)
(52) U.S. Cl. ....................... 204/601; 204/600
(58) Field of Classification Search ................ 204/180, 204/601, 450, 600; 435/100
See application file for complete search history.

(56) References Cited

U.S. PATENT DOCUMENTS

| | | | |
|---|---|---|---|
| 4,636,785 A * | 1/1987 | Le Pesant | 345/37 |
| 4,818,052 A | 4/1989 | Le Pesant et al. | |
| 5,593,565 A * | 1/1997 | Ajdari et al. | 204/643 |
| 5,992,820 A | 11/1999 | Fare et al. | |
| 6,337,740 B1 | 1/2002 | Parce | |
| 7,016,560 B2 * | 3/2006 | Ticknor et al. | 385/16 |
| 2002/0043463 A1 | 4/2002 | Shenderov | |

FOREIGN PATENT DOCUMENTS

| | | |
|---|---|---|
| WO | WO 96/12540 | 5/1996 |
| WO | WO 00/60341 | 10/2000 |
| WO | WO 00/74850 A2 | 12/2000 |
| WO | WO 02/069016 A2 | 9/2002 |

OTHER PUBLICATIONS

Bin Zhao et al.; "Surface-Directed Liquid Flow Inside Microchannels"; Science, vol. 291, 2001, pp. 1023-1026.
W. Ehrfeld et al.; "Fabrication of Components and Systems for Chemical and Biological Microreactors"; Microreaction technology, IMRET1, 1997, pp. 72-90.

* cited by examiner

*Primary Examiner*—Alex Noguerola
(74) *Attorney, Agent, or Firm*—Oliff & Berridge, PLC

(57) ABSTRACT

The microfluidic device comprises at least one microchannel bounded by a bottom wall, side walls and a top wall and which is designed to contain at least one liquid and at least one fluid non-miscible with the liquid. The microfluidic device comprises means for stabilizing the interface between the liquid and the fluid. The means for stabilizing comprise at least one electrode arranged on at least one part of a first wall of the microchannel, over the entire length thereof, and at least one counter-electrode arranged over the entire length of the microchannel, on at least one part of a second wall, arranged facing the electrode. The electrode and counter-electrode are preferably respectively arranged on the bottom and top wall of the microchannel.

14 Claims, 5 Drawing Sheets

US 7,591,936 B2

MICROFLUIDIC DEVICE WHEREIN THE LIQUID/FLUID INTERFACE IS STABILIZED

This application is a 371 of PCT/FR03/03519, filed Nov. 27, 2003.

BACKGROUND OF THE INVENTION

The invention concerns a microfluidic device comprising at least one microchannel designed to contain at least one liquid and at least one fluid non-miscible with the liquid and means for stabilizing the interface between the liquid and the fluid, said microchannel being bounded by a bottom wall, side walls and a top wall.

STATE OF THE ART

Microlabs or microfluidic devices, better known as μ-TAS (micro Total Analysis System) or Lab-on-a-chip, are used to perform chemical or biological operations on samples of very small volumes. These volumes are for example of an order of magnitude comprised between a nanoliter and a microliter. It is thus known to use microfluidic devices to perform mixtures, separations, temperature checks, reactions or extractions by solvent.

On this scale, one of the major difficulties arising from placing two phases non-miscible with one another in contact and, more particularly, when mass transfer takes place between the two phases, in the case of an extraction by solvent for example, is stabilization of the interface between the two phases.

Different method exist for stabilizing liquid/liquid or liquid/gas interfaces. Thus, in larger scale devices, it is known to stabilize the interface between two non-miscible phases by means of a porous membrane. For example, the document WO-A-9,612,540 describes a device and a process enabling transfer of solutes between two non-miscible fluid phases, through a flat porous membrane designed to stabilize the interface between the two fluid phases.

This technique has been adapted to the scale of microlabs, as mentioned by the document "Fabrication of components and systems for chemical and biological microreactors" by W. Ehrfeld et al. (Microreaction technology, IMRET1, 1997, pages 72-90). This document describes the use of very fine, selective membranes in microlabs to perform extractions and filtrations.

It is also known to modify the surface properties of a microchannel wherein two phases non-miscible with one another are placed. Thus, the document "Surface-directed liquid flow inside microchannels" by Bin Zhao et al. (Science, Vol 291, 2001, pages 1023-1026), describes a method for interface stabilization in a microchannel. Predetermined zones of the bottom of the microchannel are chemically treated so as to modify the wettability properties of the zones, which imposes particular paths on the two phases. Each phase in fact remains localized on the zone that corresponds the best thereto from a wettability standpoint. This technique is in particular used for applications where a large contact surface between the two phases is necessary but it is not very practical to implement.

It is also commonplace to apply a potential difference non-continuously between two electrodes for the purpose of moving a fluid from one given point to another. Thus, the document US-A-2002/043,463 describes a device designed to make a drop of electrolyte arranged in a non-miscible liquid move from a lower chamber to an upper chamber via orifices arranged in a wall separating the upper chamber from the lower chamber. Non-continuously applying a potential difference between a first couple of electrodes enables the drop to be moved, in a first step, along the lower chamber to bring it to face a predetermined orifice of the wall. Then a potential difference is applied non-continuously between a second couple of electrodes arranged respectively under the lower chamber and on the upper chamber so as to enable the drop to go from one chamber to the other through the orifice of the wall.

The documents U.S. Pat. No. 4,818,052 and WO-A-02,069,016 describe optical switches operating by means of the movement in a microchannel of a first fluid with respect to a second fluid non-miscible with the first fluid, between first and second positions. Movement of the first fluid can be achieved by non-continuously applying a potential difference between electrodes arranged on the opposite walls of the microchannel. Each electrode covers a part of the length of the microchannel so as to cause a longitudinal movement of the drop inside the microchannel by applying a sequence of control signals.

Application of a voltage in this type of device only enables a fluid to be moved in another non-miscible fluid and from one given point to another given point.

OBJECT OF THE INVENTION

The object of the invention is to provide a microfluidic device wherein the contact zone between a liquid and a fluid, non-miscible with one another, is stabilized and is easy to implement, while preserving a high contact surface between the liquid and the fluid.

According to the invention, this object is achieved by the fact that the means for stabilizing comprise at least one electrode arranged on at least one part of a first wall of the microchannel, over the entire length thereof, and at least one counter-electrode arranged over the entire length of the microchannel, on at least one part of a second wall arranged facing the electrode.

According to one development of the invention, the counter-electrode is arranged on the whole of the second wall.

According to a preferred embodiment, the electrode and counter-electrode are respectively arranged on the bottom and top wall.

According to another feature of the invention, the fluid or liquid being electrically conducting, the microfluidic device comprises insulating means arranged between the electrode or counter-electrode and said fluid or said liquid.

According to another feature, the microchannel comprises, at least at one end, two end microchannels designed for the fluid and the liquid to respectively flow therethrough.

BRIEF DESCRIPTION OF THE DRAWINGS

Other advantages and features will become more clearly apparent from the following description of particular embodiments of the invention, given as non-restrictive examples only and represented in the accompanying drawings, in which.

DESCRIPTION OF PARTICULAR EMBODIMENTS

Figure 1:
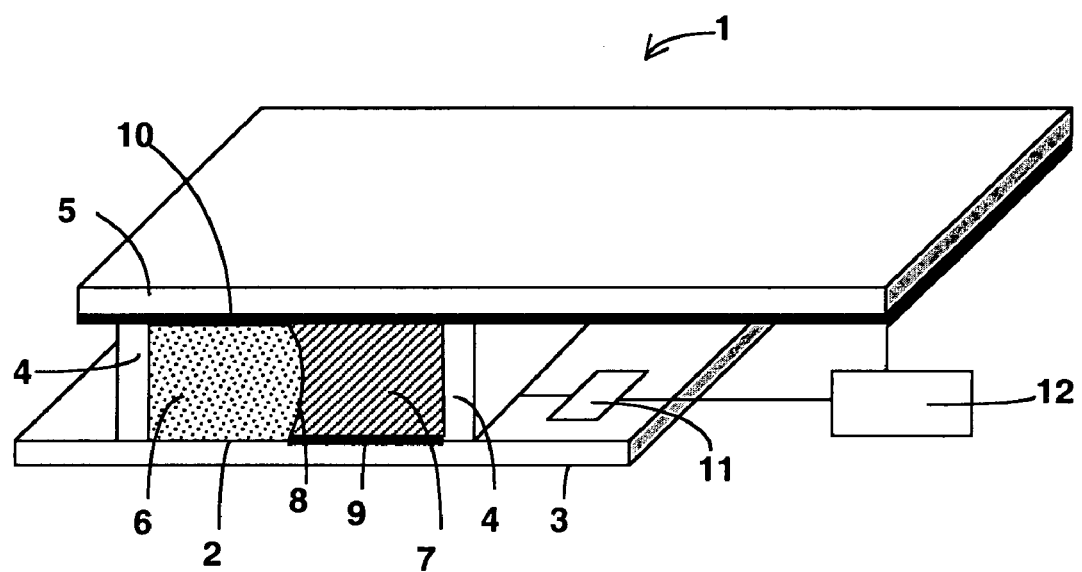
FIG. 1 is a schematic representation, in cross-section, of a microfluidic device according to the invention.

In FIG. 1, a microfluidic device 1, in particular used to perform extractions by solvent, comprises at least one microchannel bounded by a bottom wall 2 formed by a substrate 3, side walls 4 formed on the substrate and a top wall 5 parallel to the substrate. The microchannel is designed to bring a liquid and a fluid forming two phases 6 and 7 non-miscible with one another into contact. What is meant by a fluid is a liquid or a gas.

The microchannel is a hollow three-dimensional structure presenting a very great length with respect to the height. In the case where the length is very great with respect to the width, a microchannel of linear three-dimensional structure will be referred to. For example, the length of a microchannel is preferably about a few millimeters to a few centimeters, whereas the width and height are respectively about a few tens to a few hundreds of micrometers. The microchannel can also have a very great width with respect to its height, in particular when it contains a large number of phases. A microchannel of surface three-dimensional structure or a microchamber will then be referred to.

To stabilize the interface between two phases, the microfluidic device comprises at least one electrode arranged on at least one part of a first wall of the microchannel, over the entire length of the latter. At least one counter-electrode is arranged over the entire length of the microchannel, on at least one part of a second wall. The part of the second wall that comprises the counter-electrode is arranged facing the electrode. The counter-electrode can also be arranged on the whole of the second wall. The width of the electrode and of the counter-electrode is preferably about a few tens to a few hundreds of micrometers.

The microfluidic device also comprises means designed to create a potential difference between the electrode and counter-electrode. The potential difference creates forces called electrostatic forces which modify certain properties of one of the two phases or of both the phases, depending on the sensitivity of the phases with respect to these forces. Thus, the forces can be of different natures, depending on the characteristics of the liquid and fluid placed in contact. They can for example modify the wetting characteristics of one of the phases or of both phases with respect to their support. In this case, the forces are called electrowetting or electrocapillarity forces. Volumetric forces or dielectric forces acting on dielectric liquids can also be involved.

The potential difference created enables the phase that is the most sensitive to the forces created to be kept in a zone bounded by the electrode and the part of the counter-electrode arranged facing the electrode, which stabilizes the interface between the two phases, which interface can be vertical or horizontal according to the arrangement of the electrodes. Thus, if the electrode and counter-electrode are respectively arranged on the bottom wall and the top wall, the interface is substantially vertical, whereas if the electrodes are arranged on the side walls, the interface is substantially horizontal.

In FIG. 1, the electrode 9 is arranged on a part of the bottom wall 2 and the counter-electrode 10 is arranged on the whole of the top wall 5. The electrode 9 and counter-electrode 10 are respectively in contact with the phase 7 and the two phases 6 and 7. The electrode 9 and the part of the counter-electrode 10 facing the electrode 9 then form a first predetermined zone in which the phase 7 is located, the phase 8 being arranged in a second zone of the microchannel located next to the first zone.

The device also comprises an electrical contact connection 11 which connects the electrode 9 to a voltage generator 12, also connected to the counter-electrode 10. The voltage applied by the generator is either AC or DC and it is about a few tens to a few hundreds of Volts. In the case of an AC voltage, the electrical frequency can range from about a few tens of Hertz to a few tens of megahertz. Thus, the voltage created between the two electrodes is permanent, i.e. it is not applied from time to time but on the contrary throughout the use of the microfluidic device, so that during this time, the interface between the two phases is stabilized. The voltage can for example be sinusoidal.

The phases inlet to the microchannel can be immobile or in movement. If the phases are intended to be in movement, the microchannel can comprise, at least at one end, two end microchannels designed for the fluid and liquid to respectively flow therethrough. Thus, in FIG. 2, the liquid and fluid are designed to flow in a microchannel 13, respectively in first and second longitudinal and adjacent zones. The first zone is bounded, in FIG. 2, by the electrode 9, whereas the second zone corresponds to the free part of the microchannel, i.e. the part not comprising an electrode. The microchannel 13 also comprises bends so as to occupy less space than a linear microchannel.

The ends of the microchannel 13 respectively comprise an inlet microchannel 14 and an outlet microchannel 16, respectively designed for inlet and outlet of a first phase. Likewise, for inlet and outlet of a second phase, the two ends of the microchannel 13 comprise an inlet microchannel 15 and an outlet microchannel 17. The two phases flow in the microchannel 13 on paths bounded by the electrode and counter-electrode. The path of the phase that is the most sensitive to the potential difference created between the electrode and counter-electrode is represented by the electrode 9 in FIG. 2. The latter is arranged on a part of the width of the bottom wall of the microchannel 13, over the entire length of the latter, and over the entire length and width of the inlet and outlet microchannels 15 and 17. The two phases can flow in the same direction or in opposite directions.

Figure 2:
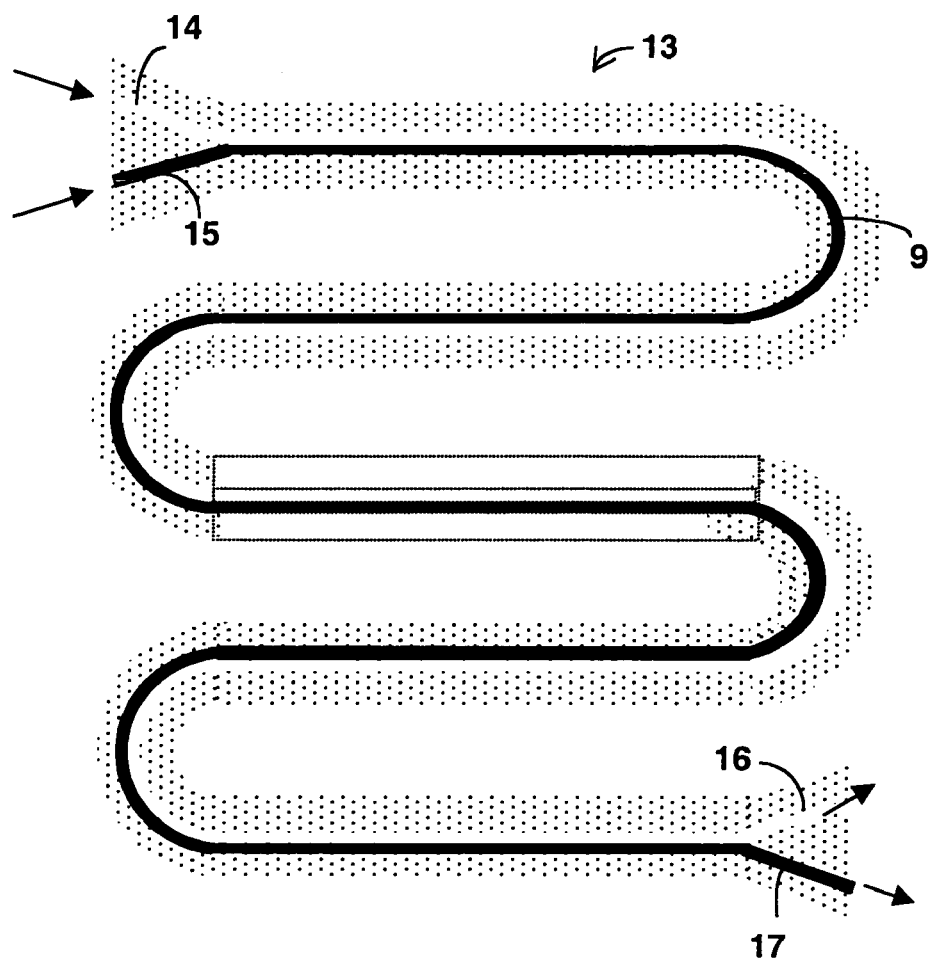
FIGS. 2 and 3 respectively represent different embodiments of a microchannel of a microfluidic device according to the invention.
Figure 3:
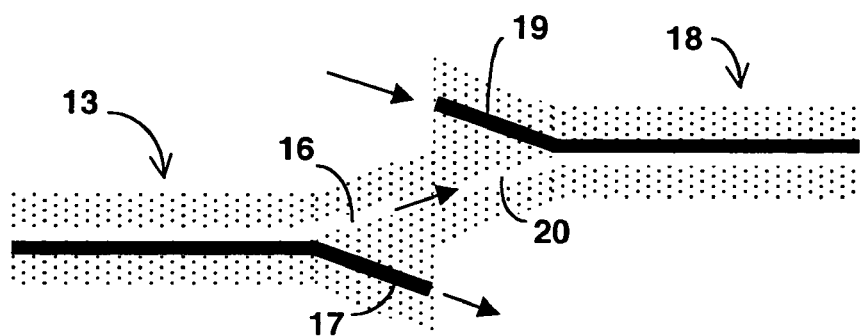
Figure 4:
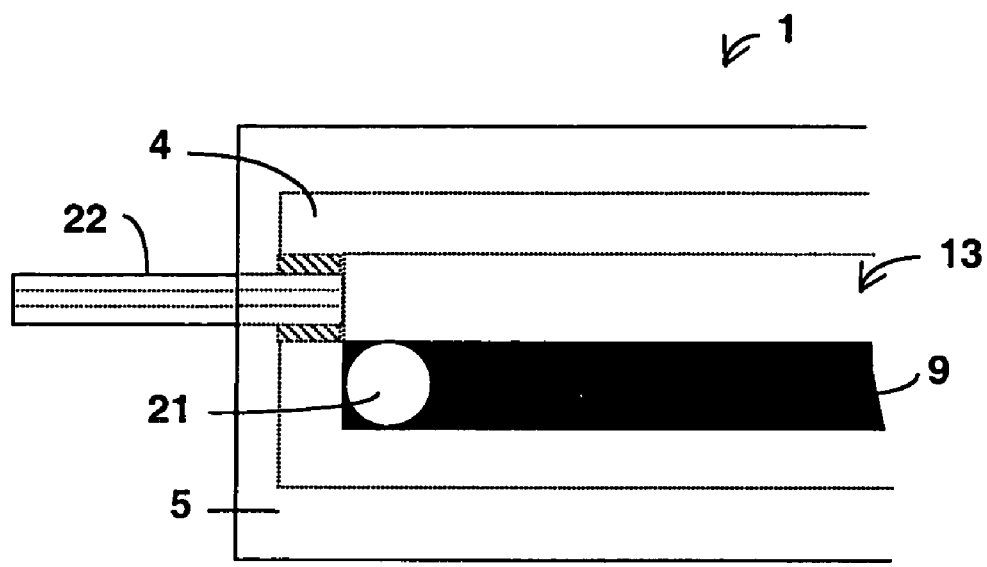
FIGS. 4 to 7 schematically represent, in top view, different steps of introducing a liquid and a fluid into a microfluidic device according to the invention.

According to alternative embodiments, the microfluidic device can comprise a plurality of microchannels arranged in series or in parallel. Thus, in FIG. 3, the microchannel 13 according to FIG. 2 is connected to a second microchannel 18 of the same geometry. The second microchannel 18 comprises an inlet microchannel 19 for introducing a third phase and an inlet microchannel 20 for introducing the first phase. The inlet microchannel 20 is connected to the outlet microchannel 16 so as to enable the first phase to flow from the first microchannel 13 to the second microchannel 18. This enables a second mass transfer to be performed between the first and third phases, the second phase of the first microchannel 13 being removed via the outlet microchannel 17. Placing several microchannels in series thus enables several successive extractions to be performed, whereas placing several microchannels in parallel enables several extractions to be performed simultaneously.

The two phases can be injected into the microfluidic device by any suitable means. Thus, the liquid and fluid can be injected by means of a pump, a water column or a plunger syringe or by capillarity or electro-osmosis. Thus, as represented in FIGS. 4 to 7, the microchannel 13 comprises a tank 21 designed to receive the second phase 7. A capillary 22 is also connected, by sticking, to one of the inlets of the microchannel 13, so as to inject the first phase.

Figure 5:
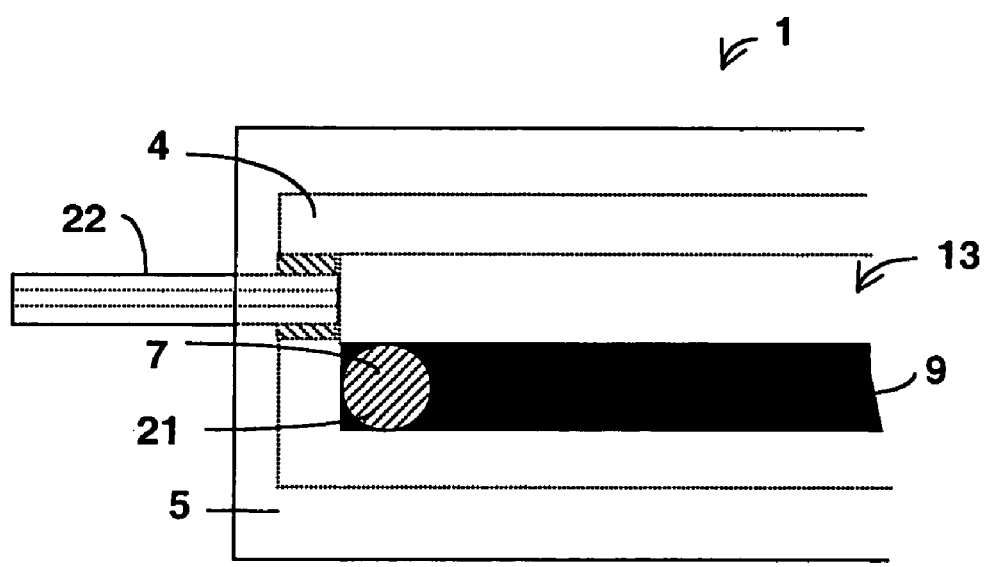
Figure 6:
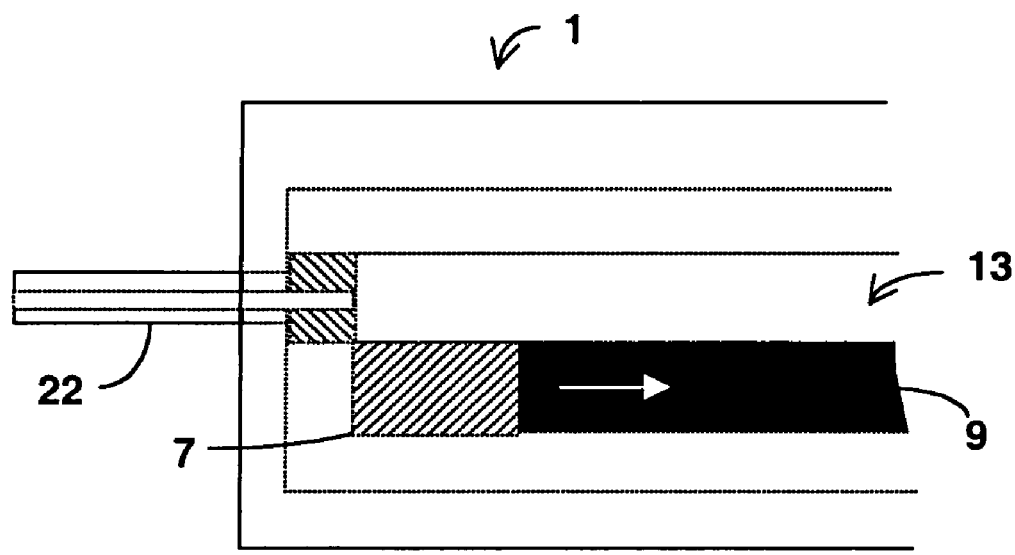
Figure 7:
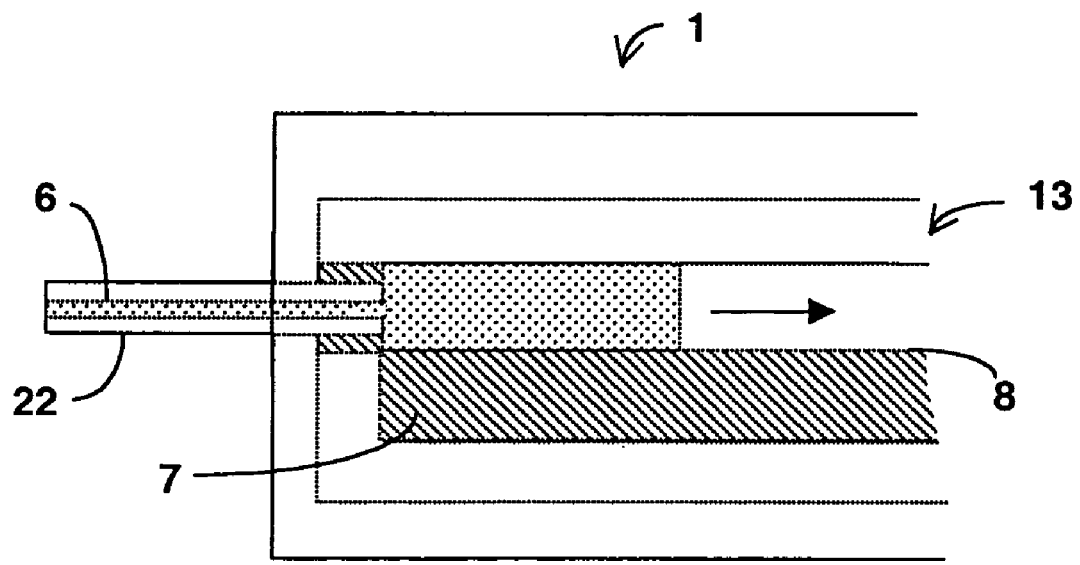

In FIG. 5, a volume of the second phase 7 is deposited in the tank 21. Due to the action of the potential difference applied between the counter-electrode (not shown) and the electrode 9, the second phase 7, which is the most sensitive to the potential difference, spreads in the zone bounded by the electrode 9 and the part of the counter-electrode facing the electrode 9 (FIG. 6). The forces created by the potential difference also play the role of a microfluidic pump, driving the second phase 7 into the zone of the microchannel 13 represented by the electrode 9 in FIG. 5. Once the second phase 7 has been injected and stabilized, the first phase 6 is injected via the capillary 22 (FIG. 7) and flows in the microchannel 13, in the free space of the microchannel 13. The interface 8 between the first and second phases 6 and 7 remains stable during this flow.

The microfluidic device according to the invention thus enables the interface between two phases non-miscible with one another to be stabilized efficiently, without requiring a physical barrier between the two phases. This presents the advantage of not reducing the contact surface between the two phases and therefore of not limiting the mass transfer between the two phases to a small surface.

Figure 8:
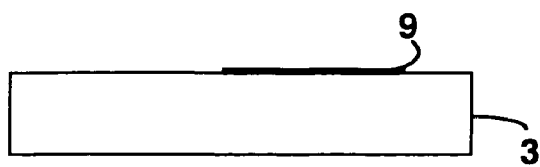
FIGS. 8 to 11 are schematic representations of different steps of achievement of a microfluidic device according to the invention.
Figure 9:
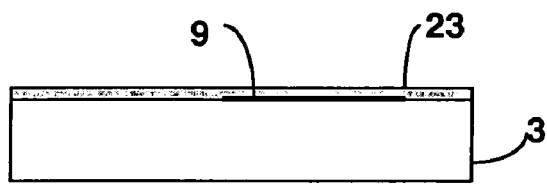

According to a first embodiment represented in FIGS. 8 to 11, the microfluidic device according to FIG. 1 is achieved from a substrate 3 made of glass or silicon with a thickness of 500 μm, whereon a gold electrode 9 is achieved by photolithography (FIG. 8). If the liquid or the fluid are electrically conducting, the microfluidic device comprises insulating means enabling the electrode and/or the counter-electrode to be protected from the conducting liquid and/or fluid. The insulating means are arranged between the electrode or the counter-electrode and the liquid or fluid. The substrate 3 comprising the electrode can thus be electrically insulated, for example, by means of a layer 23 of silicon oxide or $SiO_2$ (FIG. 9), said layer being deposited on the substrate by means of a plasma enhanced chemical vapor deposition (PECVD) process.

Figure 10:
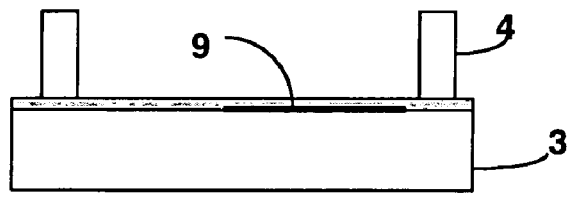
Figure 11:
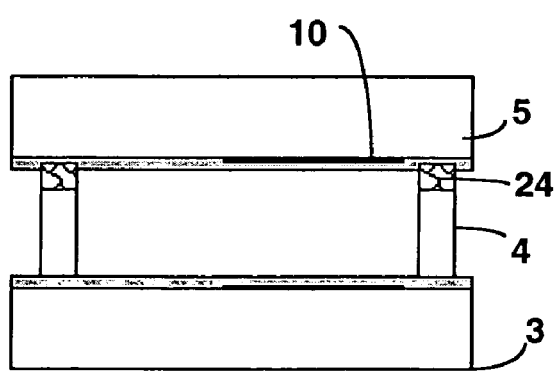

Side walls 4, made of thick resin, are then made on the substrate 3 by photolithography (FIG. 10). The top wall 5, made of glass or plastic material such as polycarbonate for example, is assembled by screen printing of glue 24 on the assembly (FIG. 11). Before this step, a part of the width of the top wall 5 has been coated with a layer of an Indium Tin Oxide (ITO) compound. Said layer forms the counter-electrode 10 and may be electrically insulated. Achieving such a microfluidic device presents the advantage of being easy to implement.

The insulating layer 23 of a few micrometers can be made of an insulating polymer, such as a dimmer of the Di Para Xylylene type more commonly known under the brand name of Parylene®, deposited in vapor phase after the side walls have been achieved. The layer can also be made of liquid fluorinated polymer, such as liquid Teflon®, deposited by spin coating before assembly by screen printing of glue. Insulation of the counter-electrode 10 is for example performed on the top wall before assembly. It can be achieved by means of deposition of an insulating layer of a few micrometers of Parylene® or Teflon®, deposited according to the techniques already described for insulation of the electrode 9. Insulation of the electrode and counter-electrode can also be performed after assembly of the bottom and top walls by depositing an insulating layer of a few micrometers of Parylene® (vapor phase deposition) or liquid Teflon® (deposition by flowing in the microchannel).

According to a second embodiment, the microchannel is achieved in the top wall 5 by hot embossing. The top wall thus structured is then coated with a layer of ITO to achieve the counter-electrode. Assembly of the top wall on the substrate comprising the electrode is then performed by screen printing of glue. If the fluid and/or liquid are electrically conducting, insulation of the electrode and of the counter-electrode is performed by one of the techniques described in the first embodiment.

The invention is not limited to the embodiments described above. Thus, the electrode and counter-electrode can be respectively arranged on the side walls of the microchannel.

The electrode and counter-electrode can also be arranged facing one another, on the whole of a first and a second wall. As the fluid and the liquid do not react in the same way to the potential difference applied between the electrode and the counter-electrode, the interface between the fluid and the liquid is then stabilized by application of the potential difference.

Moreover, the microfluidic device can contain a number of phases greater than two, each phase being non-miscible with the neighboring phases. It is also possible to couple this technique with already known techniques such as the use of a porous membrane or chemical treatment of the walls of the microchannel.

The invention claimed is:

1. A microfluidic device comprising at least one microchannel designed to contain at least one liquid and at least one fluid non-miscible with the liquid and means for stabilizing the interface between the liquid and the fluid, said microchannel being bounded by a bottom wall, side walls and a top wall, wherein the means for stabilizing comprises at least one electrode arranged on only one part of a first wall of the microchannel, over the entire length thereof, and at least one counter-electrode arranged over the entire length of the microchannel, on the whole of a second wall arranged facing the electrode, wherein the microchannel includes at least two zones, respectively designed to contain the at least one liquid and the at least one fluid non-miscible with the liquid, at least one of the two zones is formed by a space corresponding to the width of the at least one electrode arranged on only one part of the first wall.

2. The microfluidic device according to claim 1, wherein the electrode and counter-electrode are respectively arranged on the bottom and top wall.

3. The microfluidic device according to claim 1, wherein the electrode and counter-electrode are respectively arranged on the side walls.

4. The microfluidic device according to claim 1, wherein the fluid or liquid being electrically conducting, the microfluidic device comprises insulating means arranged between the electrode or counter-electrode and said fluid or said liquid.

5. The microfluidic device according to claim 1, wherein the fluid flows in the microchannel in an opposite direction to that of the liquid.

6. The microfluidic device according to claim 1, wherein the microchannel comprises, at least at one end, two end microchannels designed for the fluid and the liquid to respectively flow therethrough.

7. A microfluidic device comprising at least one microchannel designed to contain at least one liquid and at least one fluid non-miscible with the liquid and means for stabilizing the interface between the liquid and the fluid, said microchannel being bounded by a bottom wall, side walls and a top wall, wherein the means for stabilizing comprises at least one electrode arranged on only one part of a first wall of the microchannel, over the entire length thereof, and at least one counter-electrode arranged over the entire length of the microchannel, on at least one part of a second wall arranged facing the electrode, wherein the microchannel includes at least two zones, respectively designed to contain the at least one liquid and the at least one fluid non-miscible with the liquid, at least one of the two zones is formed by a space corresponding to the width of the at least one electrode arranged on only one part of the first wall, the fluid or liquid being electrically conducting, the microfluidic device comprises insulating means arranged between the electrode or counter-electrode and said fluid or said liquid.

8. The microfluidic device according to claim 7, wherein the electrode and counter-electrode are respectively arranged on the bottom and top wall.

9. The microfluidic device according to claim 7, wherein the electrode and counter-electrode are respectively arranged on the side walls.

10. The microfluidic device according to claim 7, wherein the fluid flows in the microchannel in an opposite direction to that of the liquid.

11. A microfluidic device comprising at least one microchannel designed to contain at least one liquid and at least one fluid non-miscible with the liquid and means for stabilizing the interface between the liquid and the fluid, said microchannel being bounded by a bottom wall, side walls and a top wall, wherein the means for stabilizing comprises at least one electrode arranged on only one part of a first wall of the microchannel, over the entire length thereof, and at least one counter-electrode arranged over the entire length of the microchannel, on at least one part of a second wall arranged facing the electrode, wherein the microchannel includes at least two zones, respectively designed to contain the at least one liquid and the at least one fluid non-miscible with the liquid, at least one of the two zones is formed by a space corresponding to the width of the at least one electrode arranged on only one part of the first wall, the microchannel comprises, at least at one end, two end microchannels designed for the fluid and the liquid to respectively flow therethrough.

12. The microfluidic device according to claim 11, wherein the electrode and counter-electrode are respectively arranged on the bottom and top wall.

13. The microfluidic device according to claim 11, wherein the electrode and counter-electrode are respectively arranged on the side walls.

14. The microfluidic device according to claim 11, wherein the fluid flows in the microchannel in an opposite direction to that of the liquid.

* * * * *